United States Patent [19]

Konta et al.

[11] Patent Number: 5,754,362
[45] Date of Patent: May 19, 1998

[54] LOADING/EJECTING MECHANISM FOR A TAPE RECORDER

[75] Inventors: Tsuyoshi Konta; Michihiro Sato; Katsuhiko Abiko; Kenji Kawamura; Nobuyuki Sato, all of Yamagata-ken, Japan

[73] Assignees: Pioneer Electronic Corporation, Tokyo; Tohoku Pioneer Electronic Corporation, Tendo, both of Japan

[21] Appl. No.: 658,266

[22] Filed: Jun. 5, 1996

[51] Int. Cl.$^6$ ............................................. G11B 15/675
[52] U.S. Cl. ........................................ 360/96.5; 360/96.6
[58] Field of Search ............................ 360/96.5, 96.6; 369/75.2, 77.1, 77.2; 242/335, 338.4

[56] References Cited

U.S. PATENT DOCUMENTS

| | | | |
|---|---|---|---|
| 4,319,292 | 3/1982 | Katoh | 360/96.5 |
| 4,337,487 | 6/1982 | Takai | 360/96.5 X |
| 4,672,478 | 6/1987 | Takai et al. | 360/96.5 X |
| 5,036,413 | 7/1991 | Kishimoto | 360/96.5 |
| 5,535,071 | 7/1996 | Yamagishi et al. | 360/96.5 |

*Primary Examiner*—Stuart S. Levy
*Assistant Examiner*—William R. Korzuch
*Attorney, Agent, or Firm*—Nikaido, Marmelstein, Murray & Oram LLP

[57] ABSTRACT

There is provided a loading/ejecting mechanism which comprises a moving mechanism for engaging with a cassette and for moving the cassette between an inserting position and a reproducing position. A sliding member is capable of applying a driving force to the moving mechanism so as to cause the moving mechanism to move between the inserting position and the reproducing position. A first gear is driven by a motor and provided such that in a cassette loading operation, the first gear engages with the sliding member thereby causing the sliding member to move in the loading direction. A second gear is driven by the first gear and provided such that in a cassette ejecting operation, the second gear rotates in an opposite direction to the first gear. A third gear is provided coaxially with the second gear and adapted to rotate in the same direction as the second gear, such that in the cassette ejecting operation, the third gear engages with the sliding member, thereby causing the sliding member to move in the ejecting direction.

9 Claims, 4 Drawing Sheets

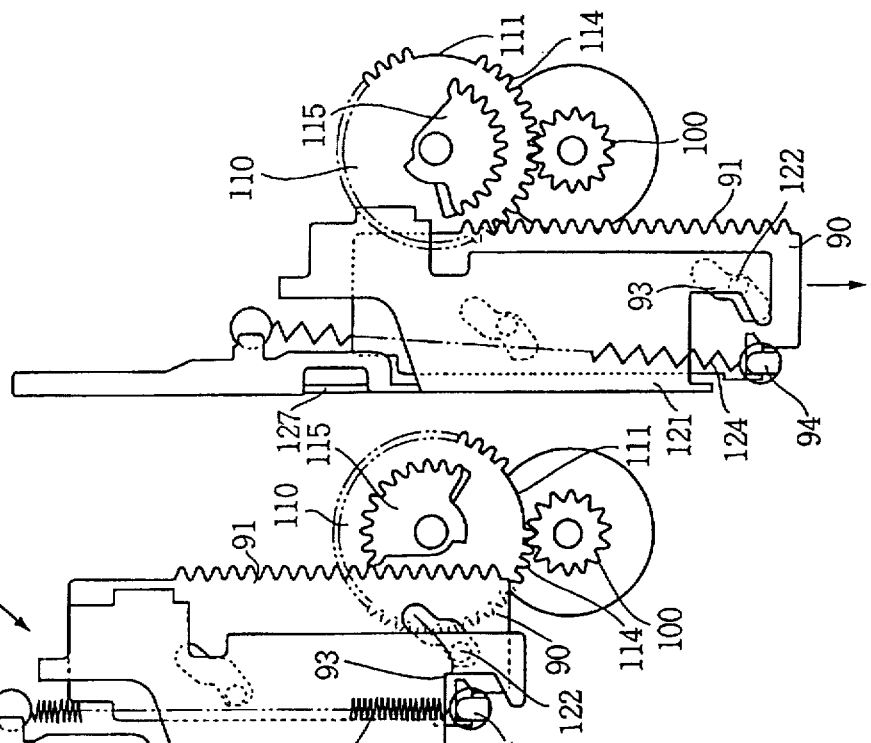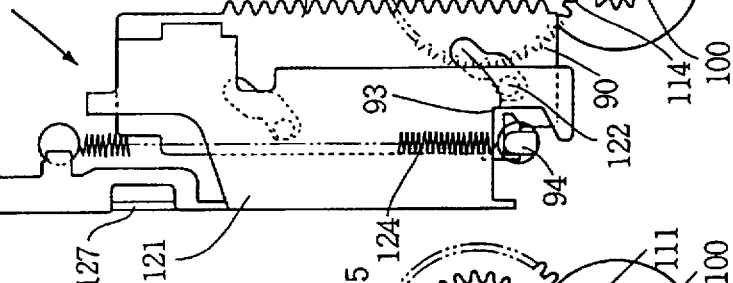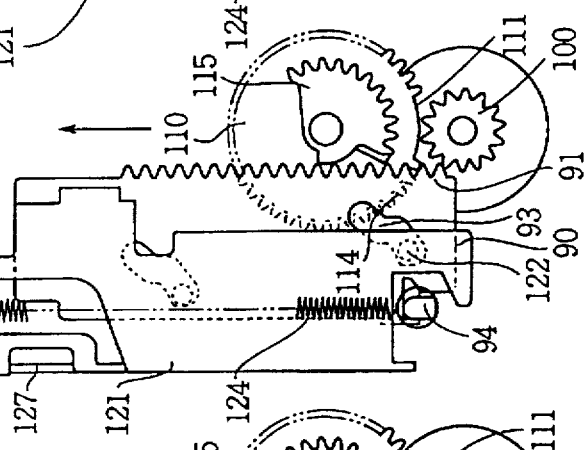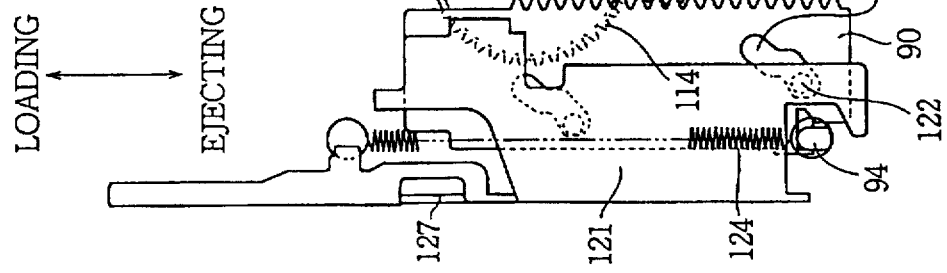

LOADING/EJECTING MECHANISM FOR A TAPE RECORDER

BACKGROUND OF THE INVENTION

This invention relates to a loading/ejecting mechanism for use in a tape recorder, particularly to a cassette loading/ejecting mechanism where a cassette may be loaded into or ejected from a tape recorder by virtue of a driving force from a motor.

FIG. 4 shows a conventional loading/ejecting mechanism for a tape recorder. As illustrated in FIG. 4, this conventional mechanism includes a gear 1 having a pin 2 secured thereon, and a sliding plate 3 having an elongated hole 4 into which the pin 2 is inserted. When the gear 1 is rotated in a clockwise or counterclockwise direction by a driving force from a motor (not shown), the pin 2 of the gear 1 may engage with either one side 4a or the other side 4b of the elongated hole 4. Thus, with the further rotation of the gear 1, the sliding plate 3 is caused to move leftwardly or rightwardly in the drawing, so that a cassette may be moved in a loading or ejecting direction by means of an arm member (not shown) engaging with the cassette on one hand and with the sliding plate 3 on the other.

Although the above conventional loading/ejecting mechanism is useful for changing a rotating movement into a straight linear movement so as to cause the sliding plate 3 to move in a loading or ejecting direction, an available stroke for the movement of the sliding plate 3 is restricted by the semi-diameter of an arc described by the pin 2 when the gear 1 is rotated. Thus, if it is desired to obtain a longer stroke for the movement of the sliding plate 3, it will be necessary to install a larger gear to replace the existing gear 1. However, due to a limited space within a tape recorder, it is difficult for the gear 1 to be replaced by a larger one, hence it will be difficult to obtain a sufficiently long stroke for the movement of the sliding plate 3.

FIG. 5 shows another conventional loading/ejecting mechanism for a tape recorder, which has been disclosed in Japanese Patent Application Laid-open No. 6-176459. As illustrated in FIG. 5, this conventional mechanism includes a loading plate 6 having a substantially rectangular hole 6d which has a rack portion 6b on one side and another rack portion 6c on the other. A sector pinion 18 is provided to engage with either the rack portion 6b or the rack portion 6c. Further, a driving member 6a is provided on the plate 6 to operate with a catching arm 5. In operation, the pinion 18 is rotated in a counterclockwise direction by a driving force from a motor (not shown), the pinion 18 engages with either the rack portion 6b or the rack portion 6c so as to cause the plate 6 to move upwardly or downwardly in the drawing. In this way, a cassette may be moved in a loading or ejecting direction by means of the catching arm 5 and the driving member 6a.

However, in the loading/ejecting mechanism shown in FIG. 5, since the pinion 18 is required to selectively engage with either the rack portion 6b or the rack portion 6c, it is necessary that the sector angle of the fan-like pinion 18 be made smaller than 180°. This, however, brings about a problem that an available stroke for the movement of the loading plate 6 will be only 1.5 times the semi-diameter of the pinion 18. If a longer stroke is required for the movement of the plate 6, it will be necessary to install a larger pinion to replace the existing pinion 18, hence a larger loading plate 6. However, due to a limited space within a tape recorder, it is difficult to install a large pinion and a large loading plate, thus it is difficult to obtain a sufficiently long stroke for the movement of the loading plate 6.

SUMMARY OF THE INVENTION

In view of the above-mentioned problems peculiar to the above-discussed prior arts, it is an object of the present invention to provide an improved loading/ejecting mechanism for a tape recorder, so that a cassette may be moved in a loading or ejecting direction with a sufficiently long stroke.

According to the present invention, there is provided a loading/ejecting mechanism which comprises a moving means for engaging with a cassette and for moving the cassette between an inserting position and a reproducing position, a sliding member capable of applying a driving force to the moving means so as to cause the moving means to move between the inserting position and the reproducing position, a first gear driven by a motor and provided such that in cassette loading operation the first gear engages with the sliding member thereby causing the sliding member to move in the loading direction, a second gear driven by the first gear and provided such that in a cassette ejecting operation, the second gear rotates in an opposite direction to the first gear, a third gear provided coaxially with the second gear and adapted to rotate in the same direction as the second gear, such that in a cassette ejecting operation, the third gear engages with the sliding member, thereby causing the sliding member to move in the ejecting direction.

In one aspect of the present invention, the sliding member has a rack portion adapted to engage with the first gear and the third gear. Further, the sliding member has guide holes such that in the cassette ejecting operation, the sliding member is allowed to move laterally away from the first gear.

In another aspect of the present invention, the second gear includes alternatively arranged toothed portions and non-toothed portions. Further, the second gear is provided with a cam member.

In a further aspect of the present invention, the third gear is a sector gear and the sector degree of the third gear is allowed to be larger than 180°. Further, the diameter of the third gear is larger than that of the first gear.

The above object and features of the present invention will become more understood from the following description with reference to the accompanying drawings.

BRIEF DESCRIPTION OF DRAWINGS

FIGS. 3a–3d are explanatory views showing the operation of the loading/ejecting mechanism of the present invention.

DETAILED DESCRIPTION OF THE PREFERRED EMBODIMENTS

Figure 1:
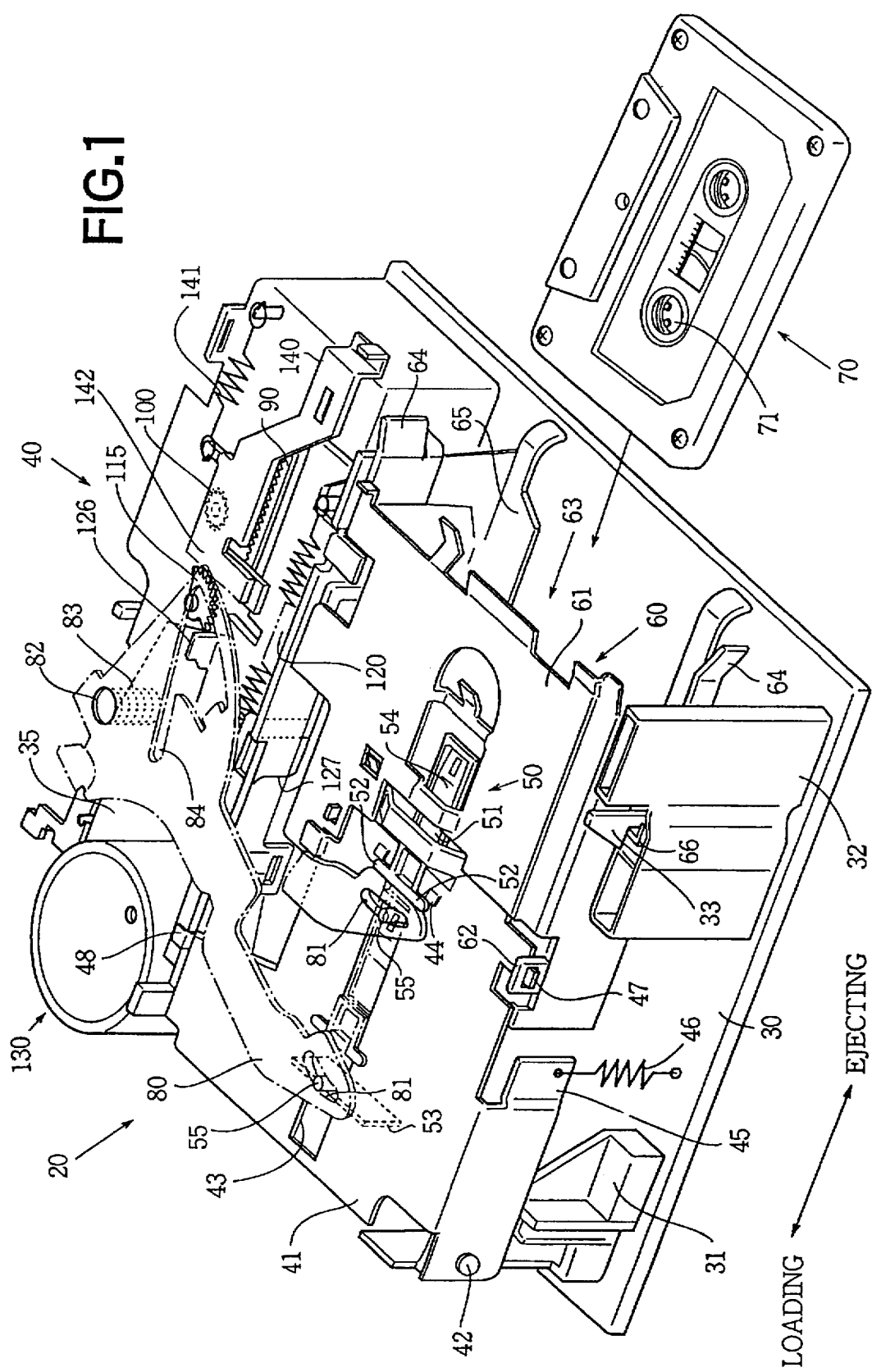
FIG. 1 is a perspective view showing a tape recorder to which the loading/ejecting mechanism of the present invention is applied.

Referring to FIG. 1, reference numeral 20 represents a tape recorder to which a loading/ejecting mechanism 40 of the present invention is applied. As illustrated in FIG. 1, the loading/ejecting mechanism 40 is provided on a chassis base 30 of the tape recorder 20.

The loading/ejecting mechanism 40 has an inverted and generally U-shaped base member 41 which is pivotally attached on a support member 31 by means of a shaft 42, so that the base member 41 is pivotable about the shaft 42 in a vertical direction. The base member 41 has an elongated guide hole 43 arranged in a loading/ejecting direction of a cassette 70. A moving means 50, which is provided to move the cassette 70 in the loading/ejecting direction, is slidably located in the elongated guide hole 43.

The moving means 50 includes a main body 51 which has an engaging member 52 adapted to engage with the edges of the elongated guide hole 43, so that the main body 51 is supported thereon by means of the engaging member 52, and is slidable in the loading/ejecting direction. Further, the base member 41 has a stopper 44 provided to restrict the movement of the main body 51 in the ejecting direction.

A retaining plate 53 is provided to be dependent from the main body 51 of the moving means 50, so that after the cassette 70 is inserted inwardly and abuts against the retaining plate 53, the front end of an elastic engaging member 54 will engage into a reel hole 71 of the cassette 70. Further, the upper edge of the retaining plate 53 is provided with a projection 55 which is adapted to engage in a hole 81 formed on a pivoting arm 80 (which will be described in detail later). With the pivoting movement of the pivoting arm 80, the moving means 50 can be moved in the loading/ejecting direction.

The base member 41 has on one side thereof a side plate 45 which is urged downwardly by a spring 46, one end of which is connected to the side plate 45 and the other end thereof is connected to the chassis base 30. A projection 47 is formed on the same side of the base member 41, such a projection 47 is provided to engage into an engaging member 62 formed on a main body 61 of a holding means 60 (which will be described in detail later).

An engaging member 66 is provided to be connected with the main body 61 of the holding means 60. A stopper member 33 together with a support member 32 are secured on the chassis base 30. Thus, the engaging member 66 can slidably engage with the stopper member 33. In this manner, during the ejection of the cassette 70, when the pivoting movement of the base member 41 causes the holding means 60 to move upwardly, the engaging member 66 will move upwardly along and in contact with the stopper member 33, ensuring that the upwardly moving force can be properly controlled.

Further, a pair of guide members 64 are provided on the both sides of an opening 63 of the holding means 60, so that the cassette 70 may be easily inserted into the tape recorder 20. The inserted cassette 70 will be held on a holding member 65.

Figure 2:
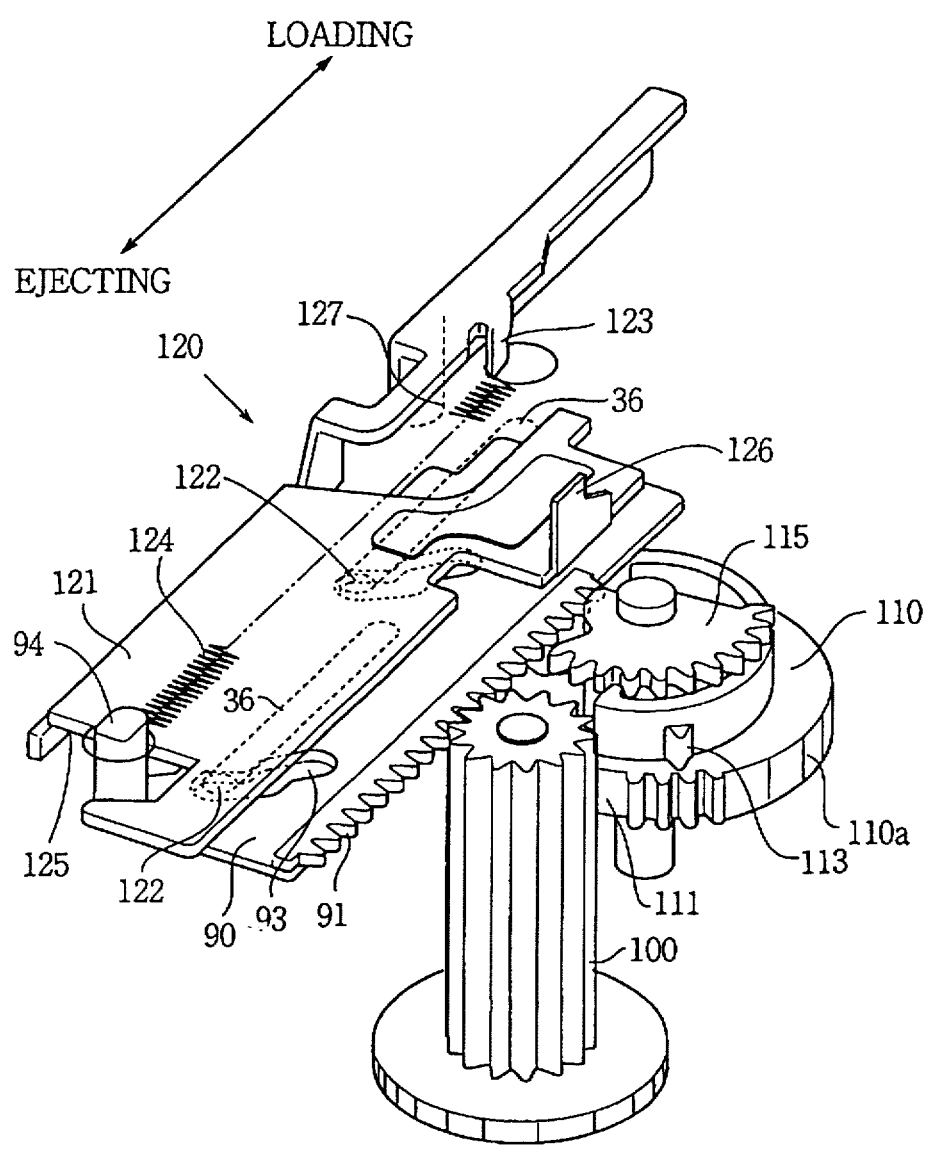
FIG. 2 is a perspective view showing an important part of the loading/ejecting mechanism of the present invention.
Figure 4:
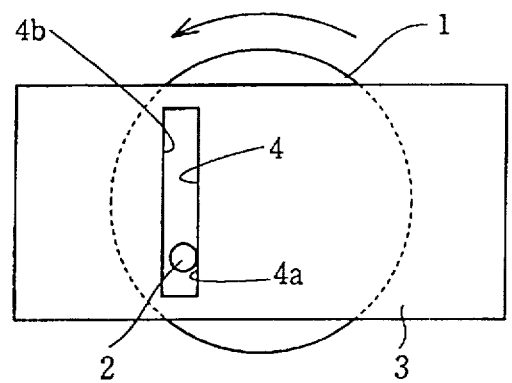
FIG. 4 is an explanatory view showing a conventional loading/ejecting mechanism.
Figure 5:
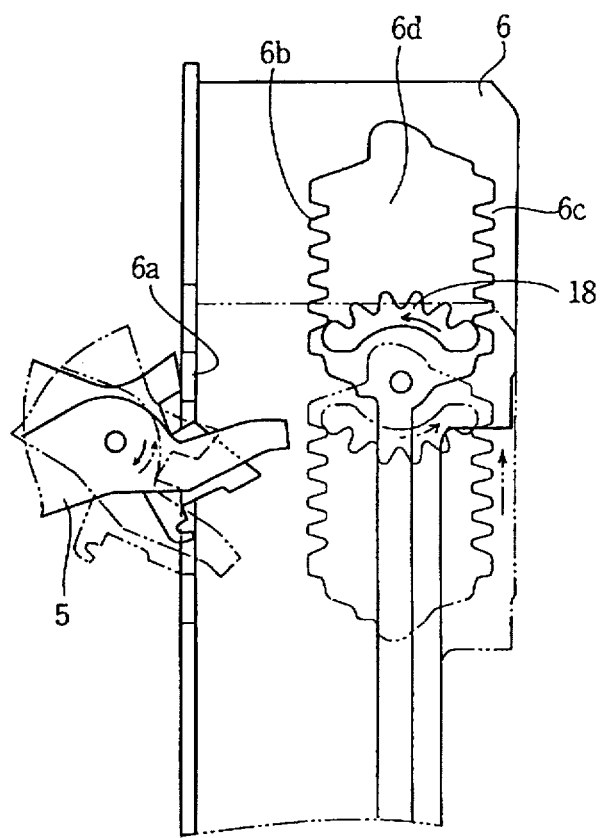
FIG. 5 is an explanatory view showing another conventional loading/ejecting mechanism.

The pivoting arm 80 is provided to be pivotable about a shaft 82 which is erected on a chassis base 35. A spring 83 is attached to the shaft 82. One end of the spring 83 is connected to an engaging member 126 of an operating means 120 (FIG. 2). During the ejection of the cassette 70, the pivoting arm 80 will be effected by means of the spring 83 to pivot in the ejecting direction.

The pivoting arm 80 has an engaging hole 84 adapted to be engaged with the engaging member 126 of the operating means 120. The operating means 120 cooperates with a sliding member 90 (FIG. 2). During the loading of the cassette 70, the sliding member 90 will be moved in the loading direction, the member 126 engaged in the hole 84 will cause the pivoting arm 80 to pivot in the loading direction.

Referring to FIG. 2, the sliding member 90 is formed with a rack portion 91 on one side thereof. Engaged with the rack portion 91 is a first gear 100 which is rotated by a driving force from a motor 130 (FIG. 1). The gear 100 is further engaged with a second gear 110 which includes non-toothed portions 111 and toothed portions 110a arranged alternatively. The second gear 110 also includes a cam member 113. In addition, a third gear 115 which is a sector gear having a fan-like shape, is coaxially provided on the gear 110, so that the third gear 115 can rotate together with the second gear 110 as an integral unit. On the other hand, the third gear 115 is provided to be engagable with the rack portion 91 of the sliding member 90. In this manner, when the second gear 110 rotates, the third gear 115 also rotates, thus causing the sliding member 90 to move in the ejecting direction.

As shown in FIG. 2, over the sliding member 90 is provided the operating means 120 having a main body 121. Engaging pins 122 are provided to be dependent from the bottom surface of the main body 121, and to slidably engage in elongated guide holes 36 of the chassis 35. The engaging pins 122 are further engaged in holes 93 formed on the sliding member 90. Since each of the holes 93 is arranged as forming an approximately 45° angle with the longitudinal direction of the sliding member 90, when the sliding member 90 moves and at same time is pushed leftwardly, the sliding member 90 is also allowed to move in a orthogonal direction with respect to the operating means 120.

Further, a spring 124 is tensed between an engaging shaft 94 of the sliding member 90 and a projection 123 of the operating means 120. When the sliding member 90 is moved in the loading direction, the engaging shaft 94 will engage in a notch 125 of the main body 121 of the operating means 120, causing the operating means 120 to move in the same direction. On the other hand, when the sliding member 90 is moved in the ejecting direction, the urging force of the spring 124 will cause the operating means 120 to move in the same ejecting direction.

Further, the operating means 120 includes a cam portion 127 (see FIGS. 1 and 2). On the other hand, the base member 41 is provided with an engaging member 48 on one side thereof. In ejecting operation, the cam portion 127 can engage with the engaging member 48 and upwardly press it, so that the base member 41 will pivot upwardly about the shaft 42, thereby pushing up the holding means 60.

Referring to FIG. 1, a lever 140 is provided to be urged by a spring 141 in the ejecting direction. Thus, when the lever 140 is pressed inwardly in a horizontal direction, a front portion 142 of the lever 140 will abut against the cam portion 113 of the gear 110 to cause the gear 110 to rotate a little in the counterclockwise direction, so that the toothed portion 110a of the gear 110 will become engaged with the gear 100.

The operation of the loading/ejecting mechanism according to the present invention will be described as follows.

As shown in FIG. 1, upon the insertion of the cassette half 70 into the tape recorder 20, the front edge of the cassette 70 will become engaged with the retaining plate 53 of the moving means 50. Meanwhile, the elastic engaging member 54 will engage in the reel hole 71. In this way, the cassette 70 may be held on the holding means 60.

With the insertion of the cassette 70, a switch (not shown) is turned on so that the motor 130 begins to rotate. As illustrated in FIGS. 3a and 3b, the driving force from the motor 130 will cause the the gear 100 to rotate in the clockwise direction, so that the sliding member 90 will move in the loading direction by virtue of the engagement of the gear 100 with the rack portion 91 of the sliding member 90. Therefore, the sliding member 90 is moved from a position shown in FIG. 3a into a position shown in FIG. 3b.

During the operation shown in FIGS. 3a and 3b, since the first gear 100 is positioned beside the non-toothed portion 111 of the gear 110, the driving force of the gear 100 will not be transmitted to the gear 110.

Referring to FIG. 2, with the movement of the sliding member 90 in the loading direction, the engaging shaft 94 of the sliding member 90 will push the operating means 120 in the same loading direction. When the operating means 120 moves in the loading direction, the engaging member 126 engages in the hole 84 of the pivoting arm 80 (FIG. 1), so that the pivoting arm 80 will pivot in the loading direction against the urging force of the spring 83.

The pivoting movement of the pivoting arm 80 will cause the projection 55 (FIG. 1) to move in the same direction, so that the moving means 50 will move in the loading direction along the guide hole 43. Thus the cassette 70, with its reel hole 71 being engaged by the engaging member 54, will move in the loading direction.

Further, with the pivoting movement of the pivoting arm 80 in the loading direction, the cassette 70 will be moved into the inmost position in the tape recorder 20. Meanwhile, the cam portion 127 (FIG. 1) of the operating means 120 will reach the engaging member 48 of the base member 41, thus the engaging member 48 will move relative to cam portion 127, with the member 48 moving down along the contour line of the cam portion 127. In this way, the base member 41 will pivot downwardly about the shaft 42 by virtue of the urging force of the spring 46. Thus, with the downward pivoting movement of base member 41 and through the engaging member 62 (of the holding member 60) movably engaged with the engaging member 47 (of the base member 41), a downward pressing force will be exerted on the holding member 60 so as to lower down the holding member 60.

During the loading operation, the engaging member 66 (connected with the holding member 60) will get tight contact with the stopper 33 and move downwardly, so as to properly control the downward force being exerted on the holding member 60.

Thus, the loading operation of the cassette 70 is completed and the tape can be reproduced.

On the other hand, when the cassette 70 is to be ejected, the lever 140 (FIG. 1) is inwardly pushed so that the front end 142 thereof will abut against the cam member 113 (FIG. 2) to cause the gear 110 to rotate a little in a counterclockwise direction. Thus, the teeth 114 of toothed portion 110a of the gear 110 will engage with the gear 100.

Then, as illustrated in FIGS. 3c and 3d, the gear 115 will engage with the rack portion 91 of the sliding member 90, the counterclockwise rotation of the gear 115 will cause the sliding member 90 to move in the ejecting direction. Therefore, the sliding member 90 is moved from a position shown in FIG. 3c into a position shown in FIG. 3d.

In this manner, since the semi-diameter of the third gear 115 is larger than that of the first gear 100, the sliding member 90 will be pushed toward the left (FIG. 3d) along the holes 93. Thus, when the sliding member 90 is moved in the ejecting direction, the rack portion 91 of the sliding member 90 will be away from the gear 100, thereby avoiding any trouble possibly caused by an undesired engagement between the rack portion 91 and the gear 100.

Therefore, with the movement of the sliding member 90 in the ejecting direction, the operating means 120 will move in the same ejecting direction by virtue of the urging force of the spring 124. Meanwhile, the engaging member 48 of the base member 41 will move relative to the cam portion 127 of the operating means 120, with the member 48 moving up along the contour line of the cam portion 127. In this way, the base member 41 will pivot upwardly about the shaft 42 against the urging force of the spring 46. Thus, with the upward pivoting movement of base member 41 and through the engaging member 62 (of the holding member 60) movably engaged with the engaging member 47 (of the base member 41), an upward force will be exerted on the holding member 60 so as to raise the holding member 60.

During the ejecting operation, the engaging member 66 (connected with the holding member 60) will get tight contact with the stopper 33 and move upwardly, so as to properly control the upward force being exerted on the holding member 60.

With the movement of the operating means 120 in the ejecting direction, the engaging member 126 will also move in the same ejecting direction, thus causing the pivoting arm 80 to pivot about the shaft 82 toward ejecting direction. In this way, the projection 55 engaged in the hole 81 of the pivoting arm 80 will be moved in the ejecting direction. Thus, with the moving of the moving means 50 in the ejecting direction, the cassette 70 will be moved in the same direction by being engaged with the engaging member 54.

It is understood from the above description that, since the third gear 115 is engaged with the rack portion 91 of the sliding member 90 only during ejecting operation, the sector degree of the fan-like gear 115 is allowed to be larger than 180°. Thus, it is allowed to obtain a relatively large stroke for the movement of the sliding member 90. In principle, it is possible to obtain a loading/ejecting stroke which is 2.5 times the diameter of the gear 115. Therefore, the stroke for the movement in loading/ejecting the cassette 70 has been sufficiently enlarged as compared with a conventional loading/ejecting mechanism.

In addition, by properly changing the diameters of the first gear 100 and the third gear 115, it is permitted to optionally set a desired speed for moving the cassette 70 in the loading/ejecting direction, thereby improving the operability of the loading/ejecting mechanism.

While the presently preferred embodiment of the this invention has been shown and described above, it is to be understood that the above disclosure is for the purpose of illustration and that various changes and modifications may be made without departing form the scope of the invention as set forth in the appended claims.

What is claimed is:

1. A loading/ejecting mechanism for use in a tape recorder having a chassis, said loading/ejecting mechanism comprising:

a moving means for engaging with a cassette and for moving the cassette between an inserting position and a reproducing position;

a sliding member capable of applying a driving force to the moving means so as to cause the moving means to move between the inserting position and the reproducing position;

a first gear driven by a motor, provided such that in a cassette loading operation, the first gear engages with the sliding member, thereby causing the sliding member to move in a loading direction;

a second gear driven by the first gear, provided such that in a cassette ejecting operation, the second gear rotates in an opposite direction to the first gear;

a third gear provided coaxially with the second gear and adapted to rotate in the same direction as the second gear, such that in the cassette ejecting operation, the third gear engages with the sliding member, thereby causing the sliding member to move in an ejecting direction.

2. The loading/ejecting mechanism according to claim 1, wherein the sliding member has a rack portion adapted to engage with the first gear and the third gear.

3. The loading/ejecting mechanism according to claim 1, wherein the sliding member has guide holes such that in the cassette ejecting operation, the sliding member moves laterally away from the first gear.

4. The loading/ejecting mechanism according to claim 3, wherein the guide holes of the sliding member are engaged with pins which in turn are slidably engaging in elongated holes formed on the chassis of the tape recorder.

5. The loading/ejecting mechanism according to claim 1, wherein the second gear includes alternatively arranged toothed portions and non-toothed portions.

6. The loading/ejecting mechanism according to claim 1, wherein the second gear is provided with a cam member.

7. The loading/ejecting mechanism according to claim 1, wherein the third gear is a sector gear.

8. The loading/ejecting mechanism according to claim 7, wherein a sector degree of the third gear is allowed to be larger than 180°.

9. The loading/ejecting mechanism according to claim 1 or 8, wherein the diameter of the third gear is larger than that of the first gear.

* * * * *